SUPERCONDUCTING COMPOSITE ARTICLES

Filed Aug. 20, 1964

Inventors:
Peter Cannon;
Edward T. Conlin, II,
by [signature]
His Attorney.

3,301,643
Patented Jan. 31, 1967

3,301,643

SUPERCONDUCTING COMPOSITE ARTICLES

Peter Cannon, Alplaus, and Edward T. Conlin II, Scotia, N.Y., assignors to General Electric Company, a corporation of New York Filed Aug. 20, 1964, Ser. No. 390,978
7 Claims. (Cl. 29—195)

This invention relates to hard, high critical field superconductive bodies having high magnetization and exhibiting magnetic hysteresis when subjected to cyclically reversed magnetic fields and more particularly to the use of low bulk density materials as hosts for filamentary networks of metal.

As is well known, the term "superconduction" is employed to describe the type of electrical current conduction of which certain materials become capable, when cooled below a critical temperature, $T_c$, at which temperature resistance to the flow of current is essentially nonexistent. A superconductive material is, therefore, any material having a critical temperature, $T_c$, below which the ordinarily encountered phenomenon of resistance to the flow of electrical current is absent. Materials of this type will have a current induced therein when cooled below $T_c$ and subjected to an applied magnetic field and this current, even after the removal of the applied magnetic field, will theoretically continue for an infinite time. Such current is, therefore, referred to as "supercurrent" to distinguish from the ordinary current phenomenon experienced at tempeatures above the critical temperature.

By definition, a "hard" superconductor body is one wherein, either by virtue of its composition or its geometry, or both, the application of a sub-critical magnetic field thereto at temperatures below $T_c$ will result in magnetic flux being "trapped" therein. That is, the magnetic flux will remain in the body even after the applied magnetic field has been removed. This so-called trapped flux actually derives from sustaining supercurrents created in the superconductive body by the applied magnetic field. Thus, a hard superconductive body will evidence magnetic hysteresis when subjected to a cyclically-reversed applied magnetic field.

It has been concluded that the occurrence of higher critical magnetic fields, $H_c$, in hard superconductive bodies is a manifestation of the particular microstructure of the hard superconductive bodies. Thus, the microstructure of these bodies may be envisioned as comprising a fine filamentary mesh which extends throughout the bodies and the magnetic properties exhibited by high critical field superconductors are believed dependent in some fashion upon this fine filamentary mesh. The filaments of this mesh system are all interconnected and may be described as having high multiplicity.

The dimensional properties of these filaments contribute to their remaining superconductive in the presence of externally applied magnetic fields which exceed the critical field of the overall body, the host of the fine filamentary mesh. The smaller the diameter of the superconductive filament, the greater the multiplicity of connectivity in a specific volume and the better the performance, all other factors being equal.

The class of materials known as "zeolites," have in common the property of low bulk density occasioned by the presence of networks of voids or pores interconnected in a regular and repetitive arrangement with diameters ranging from about 2 to about 20 angstroms. Because zeolites are moderately good insulators (resistivity of about $10^8$ ohm-cm.) and because of the regularity of the aforementioned networks of voids or pores, zeolites are especially suitable as insulating hosts for filamentary networks of metals, particularly of superconductor metals. The term "zeolite" or "zeolitic" as employed herein contemplates not only those materials which are well-known as synthetic zelites, but also includes natural zeolitic materials; that is, any natural mineral showing base exchange behavior and containing water which can easily be removed by physical means (such as heating) to leave a matrix having a regularly arranged network of interconnected pores. Thus, this definition also encompasses naturally occurring substances as for example, chabazite, erionite, mordenite and attapulgite.

It is a principal object of this invention to prepare a filamentary network of metals in an insulating host providing networks of regularly interconnected voids having individual pore diameters significantly smaller than have been available heretofore and having increased multiplicity of connectivity.

An additional object of this invention is to provide a high critical field superconductive body comprising a zeolitic matrix having atomic size filamentary pores extending throughout, which pores are filled with a material capable of being rendered superconductive.

Another object of this invention is to provide a process for the manufacture of high critical superconductive zeolitic particles having a superconductive filamentary network extending therethrough.

Still a further object of this invention is to provide a process for fabricating composite bodies from the aforementioned zeolitic particles impregnated with filaments capable of being rendered superconductive.

The aforementioned objects are obtained according to this invention by the introduction of metal into host zeolitic particles either as molten metal applied under high pressure or as a solution, i.e., such as in the form of an ionic compound, a fluid covalent compound, or a solution of a covalent compound. In the former process (high pressure) the metal is solidified in situ by increasing the pressure while the temperature is held constant at the melting point of the metal corresponding to some lower pressure. In the latter process (solution carriage) the solvent is removed and free metal is liberated from the impregnated solution or covalent compound and deposited within the networks of interconnected voids in the zeolitic particles. Thereafter, if desired, these impregnated particles, or mixtures thereof, may be comingled and compressed into composite bodies of appropriate shape.

Other objects and features of the invention will become apparent to those skilled in the art as disclosure is made in the following detailed description of a preferred embodiment of the invention as illustrated in the accompanying sheet of drawing in which.

Figure 1:
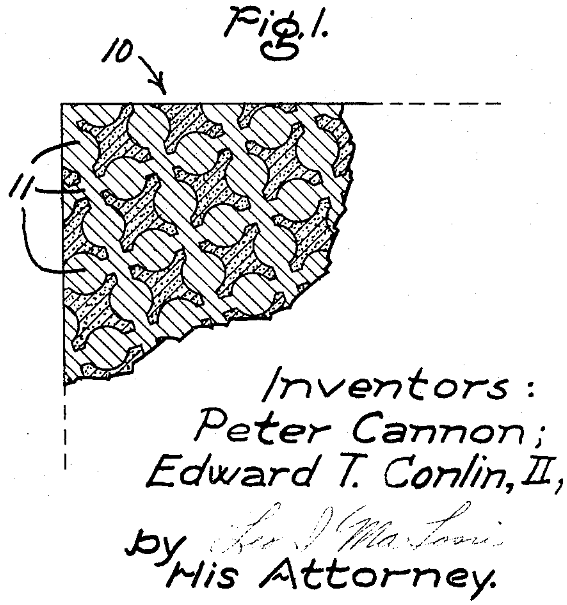
FIG. 1 is a greatly magnified view of a zeolitic particle displayed partially in cross-section showing the impregnation of metal into the particle to produce a filamentary network according to this invention.

The high critical field body shown in FIG. 1 partially in cross-section comprises a zeolite matrix 10 and a metallic superconductive filamentary structure 11 which has been introduced throughout the pore structure thereof. The matrix 10 occupied throughout by superconductive material in the regularly arranged filamentary network substantially as is schematically illustrated (greatly magnified) may be empoyed as a superconductive body when cooled to a temperature below the critical temperature, $T_c$. The diameters of the individual "threads" of superconducting material occupying the pores of the zeolite matrix 10 have a magnitude of considerably less than 100 angstroms, predominantly being in the range of from about 2 to 20 angstroms. The term "thread" is employed to designate what appears to be a series of beads connected by narrow necks. These threads interconnect in a network. In the type of zeolite illustrated in FIG. 1 the connections between the relatively straight, substantially parallel threads occurs in the neck portions. Other types of zeolites have adjacent threads juxtaposed so that the bead portions are directly opposite and connected to each other by neck-like portions. Regardless of the particular relative disposition of beads in adjacent threads, the important aspect of the arrangement in all instances is the regular and repetitive nature of the arrangements.

Particles prepared in this fashion may later be packed, cemented or bonded, and fired according to existing sintering techniques to obtain some required composite configuration. Among the conventional bonding materials suitable for the preparation of composite bodies to be sintered are water glass, kaolin and tar.

Figure 2:
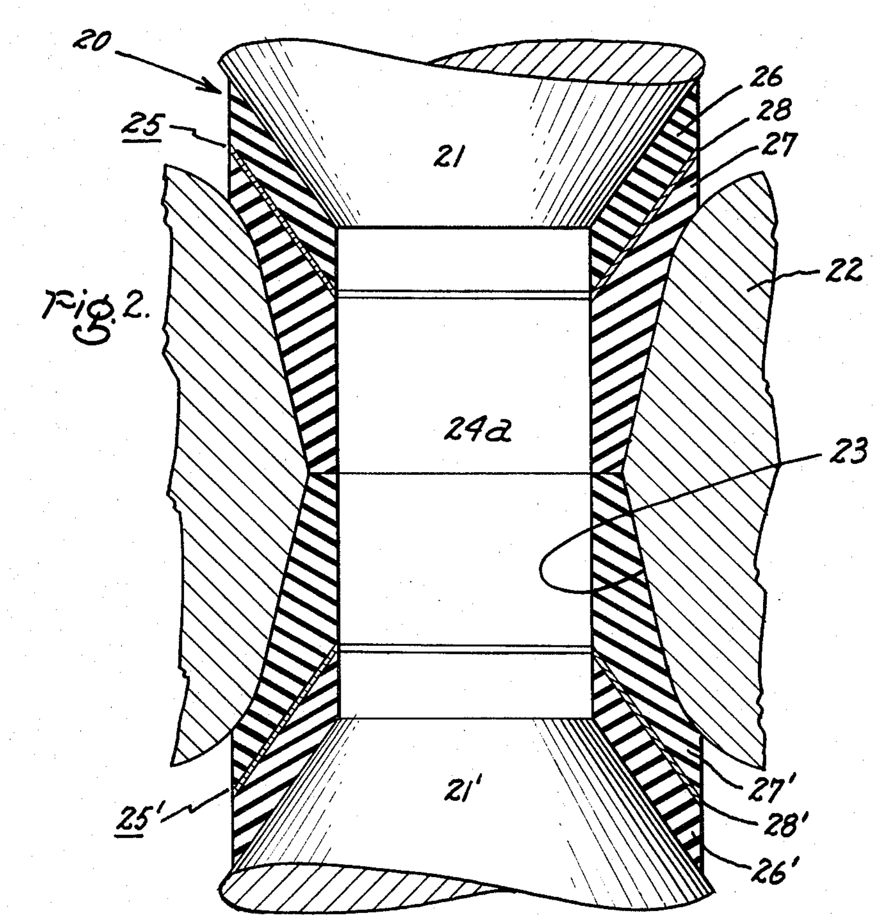
FIG. 2 is a schematic illustration in cross-section of a high pressure, high temperature apparatus suitable for the practice of the invention disclosed herein.

An impregnated body such as is shown in FIG. 1 may be produced by the use of apparatus such as is shown in FIG. 2 by the use of high pressure, high temperature techniques.

The preferred form of high pressure, high temperature apparatus shown in the drawing is the subject of U.S. Patent 2,941,248—Hall. This apparatus 20 includes a pair of punches 21 and 21' and an intermediate "belt" or die 22. Each punch is surrounded by a plurality of press-fitted binding rings (not shown), which reinforce the punches, and a soft steel outer safety ring (not shown). Die member 22 includes an aperture 23 in which there is positioned a reaction vessel 24 shown in greater detail in FIG. 3. Between each punch 21 and 21' and die 22, gasket assemblies 25 and 25', respectively, are disposed. Each gasket assembly, for example assembly 25, comprises a pair of conical pyrophyllite gaskets 26 and 27 and a conical metallic gasket 28 interposed therebetween. The reaction vessel construction shown in FIG. 3, or modification thereof, may be inserted into space **24*a* which is shown defined by the faces of punches 21, 21' and gaskets 25, 25'**.

Motion of either one of punches 21 and 21' toward the other will compress the gasket assemblies 25 and 25' and thereafter will compress the reaction vessel 24 disposed therebetween raising the pressure in the specimen in the reaction vessel 24 to a very high value. At the same time, electrical current is provided from a source (not shown) to flow via punch 21 and 21' through a suitable resistance heater (to be described below) in the reaction vessel 24, to heat the specimen.

Figure 3:
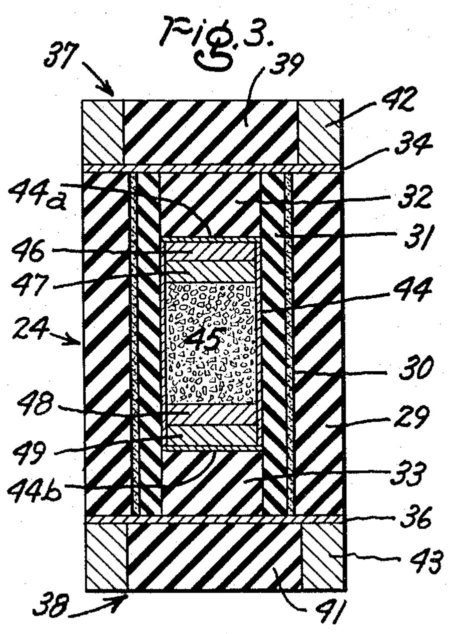
FIG. 3 is one of many arrangements for the components of a reaction cell to be introduced with appropriate gasketing into the apparatus shown in FIG. 2.

Reaction vessel 24 is of the general type disclosed in U.S. Patent 3,031,269—Bovenkerk. As shown in FIG. 3, the outer element of vessel 24 is a hollow pyrophyllite cylinder 29 measuring approximately 0.930 inch in length in one preferred configuration. Positioned concentrically within and adjacent to cylinder 29 is graphite electrical resistance heater tube 30 having a wall thickness of approximately 0.025 inch. Within the graphite tube 30 there is concentrically positioned alumina liner, or cylinder, 31. Opposite ends of liner 31 are fitted with the alumina plugs 32, 33 effectively closing the ends of alumina tube 31. Electrically conductive metallic end discs 34 and 36 arranged at each end of cylinder 29 are disposed in contact with tube 30 and conduct electricity to heater tube 30. Adjacent each disc 34, 36 is an end cap assembly 37, 38 each comprising a pyrophyllite plug or disc 39, 41 surrounded by an electrically conductive ring 42, 43. The latter rings complete the electrical circuit between punches 21 and 21' and graphite heater 30 via the discs 34, 36. Disposed within cylinder 31 between alumina plugs 32, 33 is the charge element comprising concentrically arranged tantalum tube 44 having ends **44*a* and 44*b*** respectively, defining a chamber wherein is received the charge or specimen to which the high pressures and high temperatures are to be simultaneously applied to effect the liquid metal infustion described herein.

The materials of which tubes 44 and the ends therefor are composed should be relatively inert, for example, titanium, tantalum, zirconium, etc., to avoid contamination of unwanted alloying of the charge serving to seal off the specimen within by absorbing and preventing the entry of gases into the charge element. Such gases are generated from the pyrophyllite during compression and heating. Contamination within the tube 44 is minimized by using high purity impregnating metal and preferably by heating the host material in vacuum prior to use.

Other apparatus, such as the tetrahedral anvil type described in U.S. Patent 2,968,837—Zeitlin et al. may be used in the practice of this invention.

The method employed in the high pressure, high temperature infusion of liquid metal into an inert host or matrix is as follows: a quantity of the particles of matrix material 45 is introduced and compacted into tube 44 together with discs 46, 47, 48, 49 of very pure metal such as zone-refined lead as shown; reaction vessel 24 is assembled and inserted with the surrounding gasket material into the high pressure apparatus 20 in space **24*a*; reaction vessel 24 is then subjected to a pressure ranging from 1 to about 10 kilobars (1 kilobar equals 987 atmospheres); the temperature of the reaction vessel 24 is increased to the melting point of the metal employed to effect melting thereof under the applied pressure; and then the pressure is raised to a level in excess of 10 kilobars up to a maximum of about 50 kilobars depending on the melting point and nature of the metal involved. The extent of the increase in pressure is governed by the criterion that this increase and the heating power levels (temperature within tube 44) are such that the metal will solidify due to the rapid increase in the melting point of the metal with this increase in pressure. An upper limit to the increase in pressure at a given temperature is represented by that set of conditions which would cause collapse of the zeolite into the denser phases coasite ($SiO_2$) and $\alpha$-alumina ($Al_2O_3$) or combinations thereof. After infusion, the system is cooled while still under pressure and the specimen, now solidified, is removed. The product is mechanically removed from the cell liner, tube 44**, e.g. by crushing, and then formed by well known techniques into some desirable shape. The primary effect of such successful processing is the emplacement of a finely divided metal mass into an inert host. The attainment of positive results is shown by X-ray diffraction tests of the impregnated inert host, which display extensive X-ray diffraction line broadening. In the specific case of a superconductive material, like lead, as the impregnated metal this leads to a useful increase in the field and current, which the substance can support in the zero-resistance region. Experiments show that the product of this invention will support more than four times the field which can be obtained for an equivalent bulk volume of the metal.

Since it is well known that the application of superpressures particularly at elevated temperatures may cause phase changes, it is particularly important that the temperature within tube 44 should be held substantially constant at or slightly above the melting point (corresponding to the initial pressure application) of the particular metal chosen, so that the freezing or solidification of the metal will ocur with a relatively mild increase in pressure, thereby minimizing the risk of phase change in the host or matrix during the introduction of the molten metal into the pore system of the matrix material.

In preparing the initial sample for introduction and compaction into tube 44, the metal may be employed in finely divided form or may be interspersed with the matrix material in layers to facilitate transport of the molten metal to all parts of the matrix material.

Metals such as mercury, lead, indium and indium alloys, tin, and lead-bismuth alloys are examples of superconductive metals which may be used in the practice of this invention. This list is not exhaustive and is intended solely to illustrate materials enabling ready practice of this invention.

As heretofore mentioned, bodies possessing proper geometry can be magnetically hard, regardless of whether or not a magnetically hard or soft superconductive material is used, because the interconnecting porous network in the host material, once it has been impregnated with a superconductive material, provides the necessary geometry for the attainment of a hard superconductive body, and thus permits the attainment of magnetic fields higher than that supported by the bulk metal in the superconducting state.

Preferably the extent of impregnation of the network will extend to about 40 to 50 volume percent of the body. In addition to the aforementioned process for introducing the superconducting metal into the pore network of a host material in the form of an occupying filamentary network, the following process may also be employed.

Zeolite is placed in a strong evacuable chamber and the air removed by heating to 350° C. and pumping. After cooling, a decomposable covalent compound (such as a lead alkyl) is admitted to the vessel, and becomes trapped within the pores of the host. A simple process of heating, at a rate predetermined to cause the decomposition of the covalent compound before it can effuse leads to the deposition of metal, e.g. lead, within the host and thus to the desired product.

*Example 1.—High pressure deposition*

5 grams of zone refined lead and 2 grams of an activated synthetic zeolite (Linde Molecular Sieve 13X) were placed in a tantalum vessel contained in a high pressure sample holder. The zeolite had been activated by heating to drive off water from the void system. The assembly was compressed at 9 kb. in a high pressure apparatus and the temperature of the sample was raised to 500° C. While this was being done, the compressive force was raised more gradually to $\sim$38 kb. The process was terminated after 5 minutes when the heating power was switched off and the pressure subsequently released. Nearly 5 grams of product, consisting of finely divided lead contained in a host consisting of zeolite plus about 6–7% sodalite, were recovered. The sodalite resulted from temperature degradation of a small amount of zeolite. This small amount of sodalite was easily separated because of the difference in density. X-ray examination showed extensive broadening of the diffraction lines due to lead in the zeolite product, confirming the fine particulate nature of the product. Cryogenic experiments revealed that the cell contents were superconducting, and would support a field greater than 2 KOe. (kilooersteds), compared with the value $<$0.5 KOe. for bulk lead. The stability of the product was confined by the fact that these observations were made at least several months after high pressure preparation.

*Example 2.—Deposition by chemical means*

10 grams of a zeolite (Linde Molecular Sieve 13X) was placed in a steel bomb, which was heated to 350° C. and evacuated for about an hour. After cooling, about 5 grams of lead tetramethyl was transferred by vacuum distillation into the bomb, which was then sealed and heated gently about 3 minutes. The zeolite, on recovery, showed the presence of lead by X-ray diffraction.

Therefore, since the diameters or thickness of the filaments of superconductive metal in zeolite are of a magnitude (about 2 to 20 angstroms) materially smaller than the filament sizes employed heretofore, it becomes possible to achieve magnetization values much higher than any which have previously been produced, particularly, by the impregnation with a superconductive material, which already possesses a high, critical field.

Various modifications in materials, temperatures, and pressures are contemplated and may obviously be resorted to by those skilled in the art without departing from the spirit and scope of the invention as hereinafter defined by the appended claims, as only preferred embodiments have been disclosed.

What we claim as new and desire to secure by Letters Patent of the United States is:

1. In a "hard" superconductive body of the type wherein superconductive material is dispersed in an inert insulating host material, the improvement comprising the arrangement of the superconductive material in an interconnected filamentary network having a regular repetitive pattern in the host material, the individual filaments of superconductive material having a maximum diameter of about 20 A.

2. The improved "hard" superconductive body as recited in claim 1 wherein the host material is a zeolite particle and the superconductive material is lead.

3. The improved "hard" superconductive body as recited in claim 1 wherein the host material is a zeolite impregnated with superconductive material up to a maximum of about 50 volume percent thereof.

4. A composite "hard" superconductive body comprising a plurality of high critical superconductive particles, said particles each consisting of a quantity of superconductive material dispersed through a low bulk density host material in an interconnected filamentary network having a regular repeating pattern.

5. A composite "hard" superconductive body substantially as recited in claim 4 wherein the host material is a zeolite and the superconductive material is lead.

6. A composite "hard" superconductive body substantially as recited in claim 4 wherein the host material is a zeolite impregnated with superconductive material content ranging from an effective amount to a maximum of about 50 percent by volume thereof.

7. In a "hard" superconductive body of the type wherein superconductive material is dispersed in an inert insulating host material, the improvement comprising the host material being a zeolite whereby threads of superconductive material impregnated therein are arranged in a repetitive pattern forming a stable interconnected network of high multiplicity.

References Cited by the Examiner

UNITED STATES PATENTS

| | | | |
|---|---|---|---|
| 3,196,532 | 7/1965 | Swartz et al. | 29—194 |
| 3,214,249 | 10/1965 | Bean et al. | 29—195 |
| 3,231,341 | 1/1966 | Sump et al. | 29—195 |
| 3,233,985 | 2/1966 | Kraft et al. | 29—191.2 |

DAVID L. RECK, *Primary Examiner.*

R. O. DEAN, *Assistant Examiner.*